Sept. 13, 1927.  1,642,438
E. GRANAT
ELECTRIC TRANSMISSION SYSTEM
Filed May 14, 1923
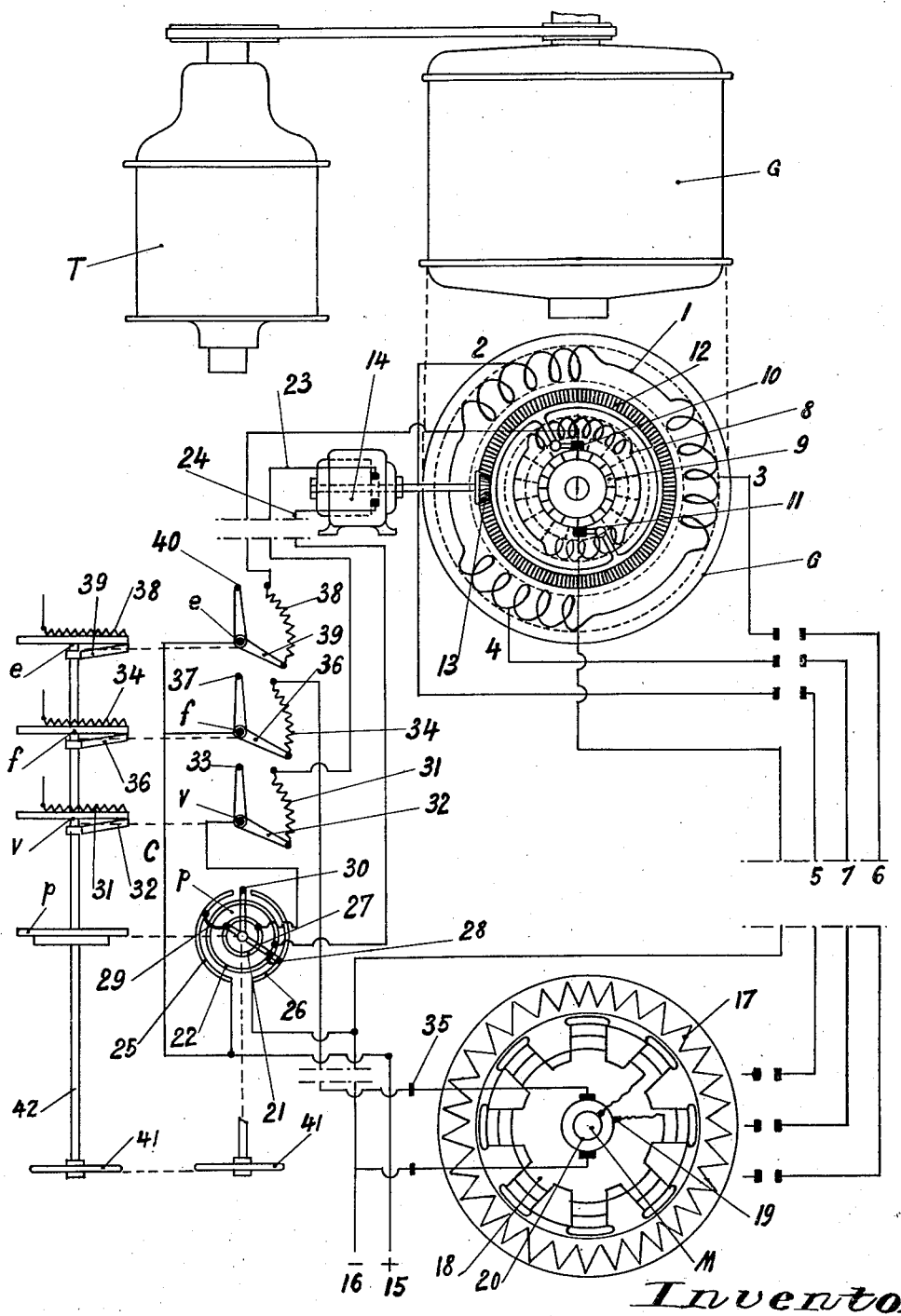
Inventor
E. Granat,
By Marks & Clerk
Attys Patented Sept. 13, 1927.

1,642,438

UNITED STATES PATENT OFFICE.

ELIE GRANAT, OF PARIS, FRANCE.

ELECTRIC TRANSMISSION SYSTEM.

Application filed May 14, 1923, Serial No. 639,013, and in France May 24, 1922.

My invention which is described hereunder has for its object a system of electric transmission with variable frequency, providing for the continuous variation of the speed and the reversal of motion, and is particularly applicable to the propulsion of vessels and to the traction of vehicles, as well as to all transmission of power between a driving shaft rotating at constant speed (such as in Diesel motors the shafts of which should always rotate at a constant speed) and an actuated shaft for which a continuous variation of speed and reversal of motion are desired.

Transmissions have been proposed, which solve this problem and comprise a generator composed of a stationary field magnet, and an armature with a commutator actuated by a motor operating at constant speed; various rows of brushes said rows being equally spaced one from another were mounted upon a movable support which could be actuated at variable speed around a commutator; when the brush arrangement is motionless, each brush co-operating with the commutator is brought to a given potential which depends solely upon the turn of the winding with which the brush is in contact; if one moves the brush around the commutator, its potential proceeds successively from zero to a maximum, according to the curve of the field of the machine. By connecting the group of equidistant brushes to the supply wires of the line the generator can supply to this line polyphase current whose frequency depends solely upon the speed of rotation of the brush arrangement. An actuated motor of the synchronous or the non-synchronous type, supplied by this line, will thus rotate at a variable speed in accordance with the variation of frequency of the current supplied.

The drawback of such a device is that the current feeding the motor flows through the movable brushes regulating the frequency of same and that thereby proper commutation under the said brushes is very difficult to ensure owing to the intensity and voltage needed.

The present invention avoids this drawback and does away with these difficulties inasmuch as the movable brushes rotate around a commutator provided on the field magnet, thus causing the inducing field to rotate at a speed which induces in the armature a current of the desired frequency. The result (i. e. the respective rotation of the induced and inducing fields) is the same as in the previous system but with the great advantage that only the exciting current of small intensity and voltage needs to flow through the rotating brushes and that proper commutation is therefore easy.

The constant-speed polyphase generator with variable frequency according to the present invention is characterized in that it possesses a stationary armature to fixed points of which are connected the line wires, and a field magnet rotating at constant speed provided with a commutator co-operating with supply brushes mounted in a movable frame. If the brushes rotate at the same constant speed as the field magnet, the field winding is always supplied at the same points, and the field piece will produce a magnetic field which rotates at the same constant speed as the shaft of the field magnet which is actuated at constant speed, and this produces in the stationary armature a polyphase current of determined frequency which supplies the line. But if one gives to the arrangement of brushes a speed of rotation which differs from the constant speed of the field piece, the supply brushes will rotate with respect to the commutator of the latter at a certain relative speed; for this reason the inducing field rotates around the shaft which supports its coils at the same relative speed. Thus finally the inducing field will rotate in relation to the armature at the same speed as the rotating brushes.

In consequence, by varying the speed of rotation of the brush arrangement, one may vary in a continuous manner the speed of rotation of the inducing field with respect to the fixed armature, and hence the frequency of the polyphase current which is produced in this armature.

The single figure of the drawing illustrates the invention in diagrammatic form.

By way of example, I have described hereunder and illustrated in the appended drawings an arrangement for electric transmission at variable frequency, comprising a generator G to be further described, this generator supplying a working motor M. The control of this electrical arrangement is effected by means of an operating station C.

The generator G comprises a stationary armature 1, three points 2, 3 and 4 of which are connected to the line wires 5, 6 and 7 and a movable field magnet 8 rotating at a constant speed under the action of a thermic motor shown diagrammatically at T. The field magnet 8 is provided with a commutator 9 on which the rotatable brushes 10 and 11 are adapted to bear. These two brushes are held by a movable support 12 provided with a bevel gear engaging a pinion 13 by an auxiliary electric motor 14 working at a variable speed.

The two brushes 10 and 11 are supplied with continuous current respectively through the wires 15 and 16.

Under these conditions, if the brushes 10 and 11 turn at the same constant speed as the commutator 9 of the field magnet 8, this commutator will be supplied at fixed points, and the field piece will produce a rotating magnetic field which revolves at the same constant speed of rotation as itself. If one varies the speed of the auxiliary motor 14 so that the supply brushes 10 and 11 turn at a different speed from that of the field piece 8, and that the said brushes have a certain relative speed with respect to the commutator, the speed of rotation of the magnetic field will be equal to the constant speed of rotation of the field piece increased or diminished by the relative speed of the brushes 10 and 11 with reference to the commutator 9, according as the speed of the brushes is greater or less than that of the commutator, or otherwise stated, the magnetic field will move at the same speed as the rotating brushes. By varying the speed of the auxiliary motor 14, one may thus vary in a continuous manner the speed of rotation of the magnetic field and produce in the fixed armature 1 and in the wires 5, 6, 7 a polyphase current of variable frequency. The induced voltage and the frequency of the current which is produced by the generator G will thus be directly proportional to the speed of the auxiliary motor 14. If therefore one varies in a continuous manner the speed of the auxiliary motor 14 actuating the movable arrangement 12 carrying the brushes 10 and 11, one can vary continuously the voltage and the frequency of the current produced by the generator G. It may be added that when the brushes are kept stationary, the inducing flux is not affected in spite of the rotation of the field magnet. The obvious reason of this lies in the fact that the distribution in space of the current flowing from one brush to the other through the field winding is not altered by the rotation of the field magnet all parts of which are equivalent.

The working motor M is a polyphase electric motor of the synchronous or the non-synchronous type. In the example herein represented, it is composed of a fixed armature 17 consisting of a continuous winding supplied at suitable points by the three line wires 5, 6, 7 and of a movable armature 18 formed by a continuous multipolar winding whereof both ends are connected to the rings 19 and 20 which are supplied with continuous current by the two line wires 15 and 16.

The control station C comprises a current reversing device $p$ for the auxiliary motor 14. This reversing device is composed of two rings 21, 22 to which are connected the two wires 23, 24 supplying the auxiliary motor 14, and of two half-rings 25, 26 which are respectively supplied with continuous current by the two line wires 15 and 16. A bar 27 provided with two bridge-pieces shown in heavy lines 28, 29 makes connection respectively between the inner ring 21 or the outer ring 22 and the two half-circles 25, 26; it is operated by a handle 30 which enables the lines 23 and 24 to be connected with 15 and 16 or reversely; in the circuit 23 is inserted a resistance 31 of rheostat $v$, the contact arm of which is manipulated by a handle 33. The starting and reversing switch thus constituted by the device $p$ and the rheostat $v$ allows the speed of the auxiliary motor 14 to be varied in a continuous manner and its direction of motion to be reversed.

The control station C also comprises an exciting rheostat $e$ for the generator G; its resistance 38 is interposed between the brush 10 and the line wire 15. The variation of the excitation is obtained by the motion of a movable arm 39 manipulated by a handle 40.

The control station further comprises an exciting rheostat $f$ for the working motor M whose resistance 34 is interposed between the line wire 15 and the supply terminal 35 of the movable armature 18. The variation is obtained by means of a movable arm 36 manipulated by a handle 37. All the handles of the rheostats $v$, $f$ and $e$, and likewise of the reversing device $p$, are keyed to the same shaft 42 shown diagrammatically and are simultaneously actuated by the handwheel 41. It is known that the intensity of the current which circulates in the induction armature of the generator G and the stator 17 depends on the E. M. F. of the generator and of the current frequency. Therefore the driving torque which depends on this intensity is also a function of these two factors, which function may be represented by F (E, W), E designating the E. M. F. in the armature and W the current frequency.

On the other hand the resistant torque depends only on the speed of the receiver motor, that is to say, on the frequency of the current. Consequently, to overcome, at all speeds, the resistant torque which depends only on the frequency, by the motor torque given by F (E, W) it is necessary that E depends on the frequency according to a law determined by that of the variation of the resistant torque with respect to the speed. Hence it is necessary to vary the excitation of the generator G by means of the rheostat e according to a law determined by the law governing the variations of E with reference to the frequency, that is, the speed of the motor 14. In other words, it is necessary that the value of the resistance 38 in circuit depends on the value of the resistance 31.

Summarizing, the commutator C permits:

1. The reversal of the direction of motion and the variation of the speed of rotation of the brushes 10 and 11, by acting on the auxiliary motor 14 (reversing device p and rheostat v).

2. The adjustment of the driving torque at a suitable value by varying the excitation of the generator G (rheostat e).

3. The variation of the excitation of the motor M through the rheostat f.

What I claim is:

1. In a variable frequency polyphase current generator controlling system for electrically transmitting a continuous rotation comprising a stationary armature and a field magnet actuated at a constant speed, the combination of a commutator provided on the rotating field magnet, feeding brushes rubbing on said commutator and adapted to rotate at any desired speed and line wires connected with equidistant fixed points on the stationary armature.

2. In a variable frequency polyphase current generator controlling system for electrically transmitting a continuous rotation comprising a stationary armature and a field magnet actuated at a constant speed, the combination of a commutator provided on the rotating field magnet, of feeding brushes rubbing on said commutator, an auxiliary motor controlling the said brushes, a starting and reversing switch for said auxiliary motor, a rheostat for the field magnet of the generator, line wires connected to equidistant fixed points on the stationary armature, and a common member operating simultaneously the starting and reversing switch and the rheostat.

In witness whereof I have hereunto set my hand.

ELIE GRANAT.